May 24, 1966  W. E. THORNTON-TRUMP  3,252,542
ARTICULATED BOOM
Filed Dec. 13, 1963  2 Sheets-Sheet 1

INVENTOR.
Walter E. Thornton-Trump
BY
Hovey, Schmidt, Johnson & Hovey
ATTORNEYS.

May 24, 1966 W. E. THORNTON-TRUMP 3,252,542
ARTICULATED BOOM
Filed Dec. 13, 1963 2 Sheets-Sheet 2
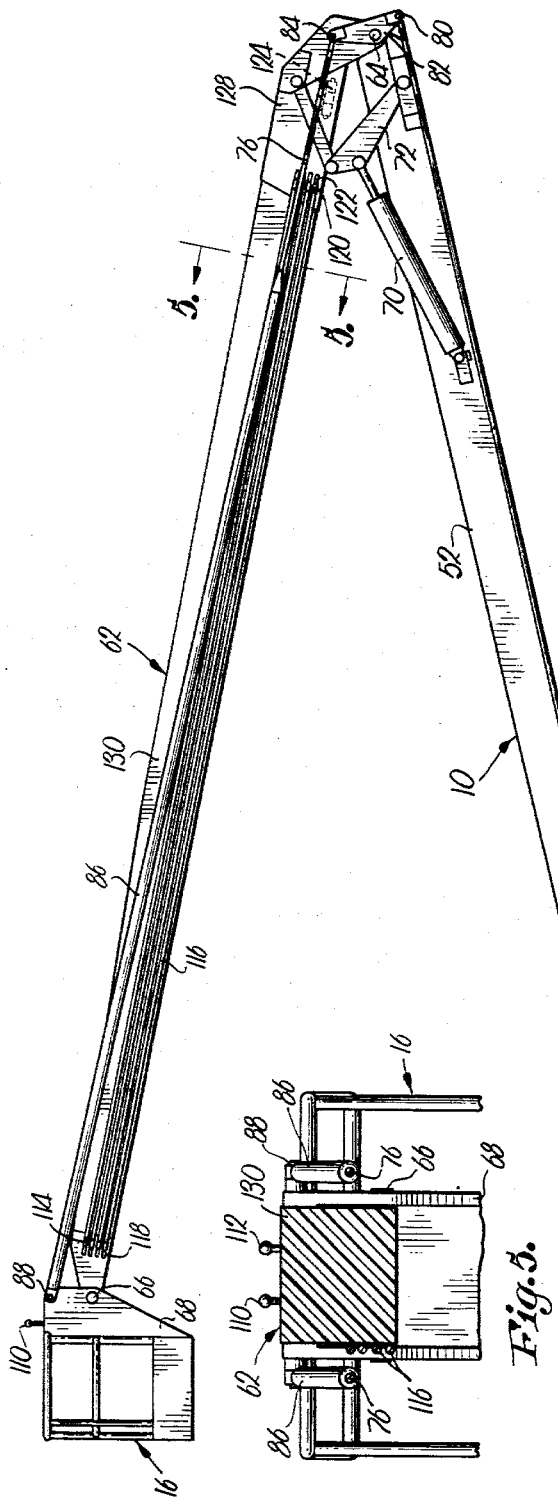
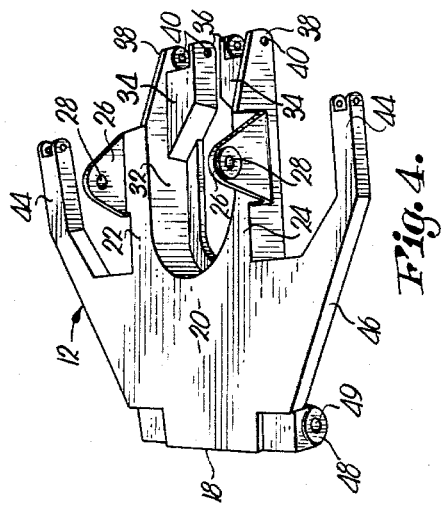
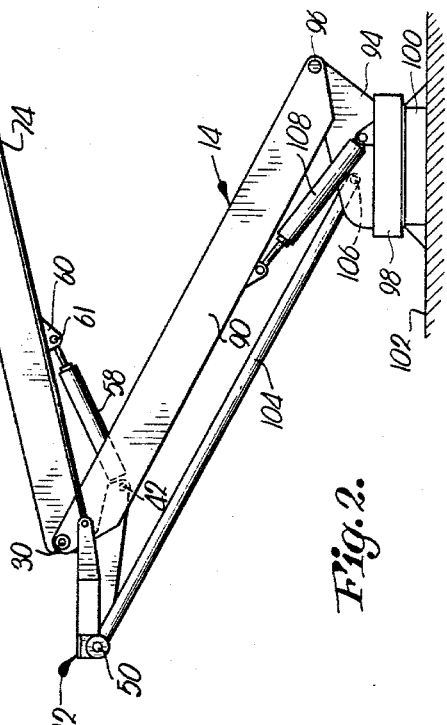
INVENTOR.
Walter E. Thornton-Trump
BY
Hovey, Schmidt, Johnson & Hovey
ATTORNEYS.

United States Patent Office 3,252,542
Patented May 24, 1966

3,252,542
ARTICULATED BOOM
Walter E. Thornton-Trump, Oliver,
British Columbia, Canada
Filed Dec. 13, 1963, Ser. No. 330,273
14 Claims. (Cl. 182—2)

This invention relates to boom structure for industrial or fire-fighting use and has as its primary object the provision of elevating means coupled with a pair of relatively shiftable boom sections in such a manner that the boom sections remain in a predetermined altitude with respect to the ground as the boom section are raised and lowered under the influence of the elevating means. Thus, before the boom sections are operated, the same may be moved to an elevated starting position and, as a result, be extended to greater distances than was heretofore possible with conventional boom apparatus. Moreover, a boom operator accustomed to operating only the boom sections may operate the boom structure of the present invention with no additional skill or knowledge other than to be able to actuate the elevating means.

Another object of the present invention is the provision of boom elevating means, which means is constructed in the form of a parallelogram so that, with the boom assembly secured to one side of the parallelogram, the attitude of the boom assembly with respect to the ground remains substantially the same as the parallelogram shifts into all operating positions thereof.

In the drawings:

FIG. 2 is a view similar to FIG. 1 but with the boom structure in an operable, extended position;

FIG. 4 is a perspective view of the base unit which pivotally interconnects the elevating means with the lowermost boom section of the boom assembly; and FIG. 5 is a cross-sectional view of the upper boom section taken along line 5—5 of FIG. 2.

Figure 3:
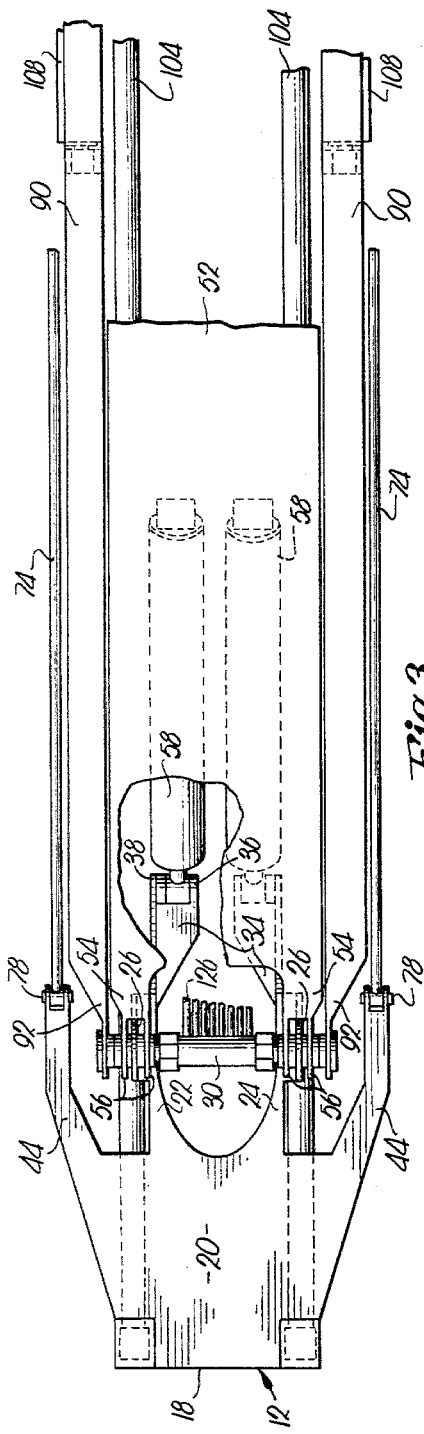
FIG. 3 is an enlarged, top plan view of a portion of the boom structure illustrating the base unit for interconnecting the elevator means with the lowermost boom section of the boom assembly, parts being broken away to illustrate details of construction.

The apparatus of the present invention includes an elongated boom broadly denoted by the numeral 10 pivotally coupled adjacent the normally lowermost end thereof to a support 12 for vertical swinging movement, and elevating means 14 pivotally coupled with support 12 and extending downwardly therefrom for raising and lowering support 12 and thereby boom 10. A platform 16 is pivotally carried on the normally uppermost end of boom 10 to provide means for receiving and elevating a workman or the like as boom 10 is raised under the influence of elevating means 14.

Support 12 is best illustrated in FIG. 4 and includes a generally flat plate 18 having an uppermost surface 20 and provided with a pair of outwardly projecting extensions 22 and 24 having normally uppermost surfaces coincident with surface 20. A pair of ears 26 are rigid to extensions 22 and 24 respectively, ears 26 being provided with aligned apertures 28 for receiving a pin 30 for a purpose to be hereinafter described.

A generally U-shaped web 32 is rigid to plate 18 and extensions 22 and 24 for strengthing the interconnection of extensions 22 and 24 with plate 18, web 32 depending from the proximal marginal edges of extensions 22 and 24 and plate 18.

A pair of inwardly extending projections 34 are rigid to the ends of web 32 and present ears 36 spaced from the outer ends 38 of web 32. Ears 36 and ends 38 are provided with aligned apertures 40 therein for receiving a pin 42 for a purpose hereinafter described.

A pair of fingers 44 are rigid to plate 18 and project outwardly therefrom substantially in the same direction as extensions 22 and 24. Fingers 44, however, extend upwardly from the plane of surface 20 as that the outer, bifurcated ends of fingers 44 are spaced above the outer ends 38 of web 32 when support 12 is in the operative position thereof illustrated in FIG. 2.

A pair of webs 46, only one of which is shown, are rigid to and dependent from plate 18 to strengthen the same at the side marginal edges thereof as is clear in FIG. 4. Webs 46 terminate at the outer ends of fingers 44 and adjacent a pair of dependent ears 48, only one of which is shown, rigid to the extremity of plate 18 remote from the extremity from which extensions 22 and 24 and fingers 44 project. Ears 48 are provided with aligned apertures 49 for receiving a pin 50 for a purpose to be hereinafter described.

Boom 10 includes a lower boom section 52 having a bifurcated lower end presenting a pair of finger-like projections 54, each of the projections 54 being in turn bifurcated to present a pair of mounting plates 56 suitably apertured to pivotally receive pin 30 as is clear in FIG. 3. Pin 30 is normally horizontally disposed so that boom section 52 is swingable about a vertical plane through the axis of pin 30.

Means for swinging boom section 52 about pin 30 includes a pair of piston and cylinder assemblies 58 pivotally secured at the upper extremities thereof to depending ears 60 rigid to boom section 52 by pins 61. The lower extremity of each of the assemblies 58 is secured by a corresponding pin 42 to a corresponding ear 36 and the associated end 38 of web 32. As shown in FIG. 3, the assemblies 58 are substantially parallel at all times for all positions of boom section 52 relative to support 12.

Boom 10 further includes an upper boom section 62 pivotally coupled by means of a pin 64 to the upper end of boom section 52. Platform 16 is pivotally secured by means of a pin 66 to the upper of boom section 62, platform 16 being rigid to a coupling unit 68 and the latter in turn being pivotally mounted on boom section 62 by means of pin 66.

Means for swinging boom section 62 about pin 64 relative to boom section 52 includes a piston and cylinder assembly 70 pivotally mounted to a linkage 72 and to boom section 52 respectively. Boom section 62 is thus swingable in a vertical plane about the axis of pin 64 when assembly 70 is extended or retracted.

Means for maintaining platform 16 substantially level at all times regardless of the position of boom sections 52 and 62 includes a pair of lower equalizing rods 74 and a pair of upper equalizing rods 76. Rods 74 are pivotally coupled by means of pins 78 to the bifurcated ends of fingers 44 as is clear in FIG. 3. Rods 74 are also pivotally coupled by means of pins 80 to a pair of plate-like members 82, the later in turn being rigid to the outer ends of pin 64. The lower ends of rods 76 are pivotally coupled by pins 84 to members 82 on the side of pins 64 opposite to the side on which pins 80 are disposed.

Each of the rods 76 is provided with a portion 86 formed of a plastic material, such as epoxy resin or the like, reinforced with Fiberglas to strengthen the same. Portion 86 is of a greater diameter than the segment of rod 76 pivotally coupled with the corresponding member 82, as is clear in FIG. 2. Preferably, portion 86 is circular in transverse cross section and completely solid throughout the length thereof to therefore have the characteristics of a "hot stick" of the type well known in the electrical industry. The upper end of portion 86 is pivotally coupled by means of a pin 88 to unit 68 in spaced relationship to pin 66.

Elevating means 14 includes a pair of spaced, generally parallel beams 90 having generally uppermost ends 92 pivotally receiving pin 30 as is clear in FIG. 3, so as to permit beams 90 to be swingably relative to support 12 in a vertical plane. The opposite ends of beams 90 are coupled to a pair of upstanding plates 94, only one of which is shown, by means of a pin 96 passing through the plates and through beams 90. Plates 94 are rigid to a structure 98, the latter in turn being rotatable about a vertical axis on a base 100 fixed to a surface 102.

A pair of control linkages 104 are pivotally coupled at the upper ends thereof to respective pins 50 and at the lower ends thereof to plates 94 by a pin 106. It is to be noted that the distance between pins 30 and 50 is substantially equal to the distance between pins 96 and 106. Also, pins 30 and 50 lie in a plane parallel to the plane in which pins 96 and 106 lie. Linkages 104 are parallel with beams 90 so that support 12, plates 94, beams 90 and linkages 104 form a parallelogram coupled with support 12 for raising and lowering the same relative to structure 98, while at the same time maintaining support 12 in a fixed attitude with respect to surface 102 for all positions of beams 90 with respect to surface 102.

Means for swinging beams 90 includes a pair of piston and cylinder assemblies 108, only one of which is shown. Each assembly 108 is pivotally coupled at the upper extremity thereof to a corresponding beam 90 and at the lower extremity thereof to structure 98 as is clear in FIGS. 1 and 2. Assemblies 108 are disposed to swing beams 90 in a vertical plane about the axes of pin 96.

Controls are provided on platform 16 for actuating assemblies 58, 70 and 108. To this end, a pair of hand-actuated control handles 110 and 112 are carried on unit 68 in the position accessible to the workman stationed on platform 16. Handles 110 and 112 are coupled through suitable linkages 114 to a number of control rods 116 which extend longitudinally of boom section 62 and exteriorly of the same as is clear in FIG. 5. Linkages 114 extend outwardly from section 62 through longitudinally extending slots 118 so that longitudinal movements of linkages 114 under the influence of the manipulation of handles 110 and 112, shift rods 116 longitudinally of boom section 62.

Linkages 120 are carried at the normally lower end of boom section 62 and are releasably secured to the lower ends of control rods 116. Linkages 120 are shiftable longitudinally of boom section 62 in slots 122 with boom section 62 to actuate a number of valves 124 housed within the lower end of boom section 62, valves 124 being utilized for actuating assemblies 58, 70 and 108 respectively. Fluid lines, such as lines 126 shown in FIG. 3, intercouple valves 124 with respective assemblies 58, 70 and 108.

Each of the rods 116 is formed from a plastic material such as epoxy resin reinforced with Fiberglas, and is of a construction similar in all respects to the portion 86 of each of the equalizing rods 76. Each control rod 116 is therefore, similar in all respects to the aforesaid "hot stick," each rod 116 being preferably circular and solid in transverse cross section.

Boom section 62 includes a segment 128 at the lower end thereof, and a segment 130 connected with segment 128 and forming the upper and major portion of boom section 62. Segment 130 is formed of a plastic material such as epoxy resin reinforced with Fiberglas and is polygonal and solid in transverse cross section as shown in FIG. 5.

Although the peripheral configuration of segment 130 may be of any design, it is clear that the major portion of boom section 62 closely resembles and has the characteristics of a "hot stick" for the purpose of electrically isolating platform 16 and the workman supported by the latter. In view of the fact that portions 86 and control rods 116 are also made of a noninsulating material such as the plastic reinforced with a suitable material such as Fiberglas or the like, platform 16 and the workman supported thereon are completely electrically isolated at all times during normal operation of boom 10.

Figure 1:
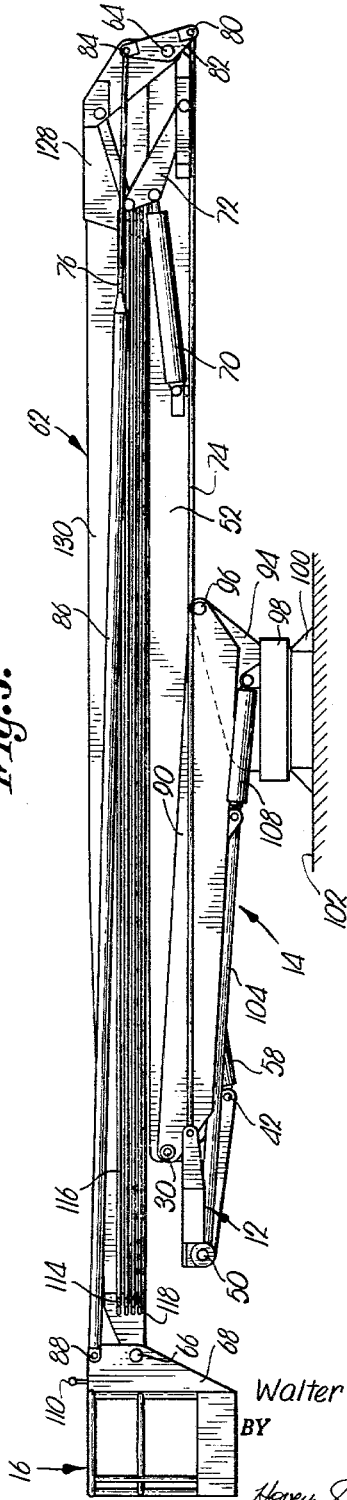
FIGURE 1 is a side elevational view of the boom structure of the present invention showing the same in its nested position.

In operation, boom 10 and elevating means 14, are in the nested positions thereof illustrated in FIG. 1. In these positions, boom section 62 overlies boom section 52 and elevating means 14 underlies boom section 52. It is to be noted that support 12, in the nested position, is in the same position as if the same were in an operative position illustrated in FIG. 2.

Surface 102 may form the bed of a truck or the like so as to render the whole assembly mobile. An operator is initially positioned on platform 16 so as to be in position to manipulate handles 110 and 112. The controls for assemblies 58, 70 and 108 may be operated so as to actuate the last-mentioned assemblies at the same time to in turn simultaneously swing beams 90 upwardly about pins 96, to swing boom section 52 upwardly about pin 30, and to swing boom section 62 upwardly about pin 64. To this end, the operator manipulates handles 110 and 112 at the same time, handle 110 being operably coupled with the valves controlling assemblies 58 and 70 so as to simultaneously actuate the same. Handle 112 is preferably coupled with the valve controlling assembly 108 for independently actuating the latter.

It is seen, therefore, that assembly 108 may be initially actuated for elevating support 12 before boom sections 52 and 62 are swung relative to each other and relative to support 12. As beams 90 are elevated under the influence of assemblies 108, support 12 is maintained in the same attitude with respect to surface 102 at all times. Thus, there is no swinging of boom 10 relative to surface 102 and, therefore, boom 10 remains in the same attitude with respect to surface 102 but at a greater distance above the latter.

When support 12 is at an elevated position above surface 102, and when assemblies 58 are actuated, boom section 52 is swung about pin 30 to raise the normally upper end of boom section 52. Unless assembly 70 is simultaneously actuated, platform 16 will descend. However, the action of rods 74 and 76 and members 82 will maintain platform 16 level at all times since the upward swinging movement of boom section 52 will translate members 82 to elevated positions without altering the attitudes of member 82 with respect to surface 102. Members 82 are maintained in the same attitude with respect to surface 102 since members 82 are coupled at the ends thereof to support 12 and platform 16 respectively.

If assembly 70 is actuated, boom section 62 will be elevated with respect to boom section 52 and again, rods 74 and 76 and members 82 will operate to maintain platform 16 level.

The upper boom section 62, portions 86 of equalizing rods 76, and control rods 116 are constructed so as to be maintained under the same high standards as "hot sticks." By placing portions 86 and control rods 116 exteriorly of boom section 62, the same may be inspected at all times during normal usage of boom 10. In addition, since control rods 116 are releasably coupled with linkages 114 and 120, control rods 116 may be removed from boom section 62 and taken into a laboratory for testing purposes. Similarly, portions 86 of rods 76 may be constructed so as to be readily disconnected from the operative positions thereof and also taken into a laboratory for testing purposes. Since segment 130 of boom section 62 is of solid construction, the peripheral surface thereof may be observed at all times during the use of boom 10 so as to maintain the latter under the same high standards as that of "hot sticks."

Having thus described the invention, what is claimed as new and desired to be secured by Letters Patent is:

1. In combination with a boom having a support, means pivotally connecting the boom with the support for vertical swinging movement of the boom with respect to the support, and means pivotally connected to both the support and the boom for swinging the latter, mechanism for raising and lowering the support comprising:

- a beam;
- structure supporting the beam for swinging movement about a substantially horizontal axis;
- means mounting said support on the beam for swinging movement with respect thereto about an axis coincident with the axis of swinging movement of the boom relative to the support;
- means pivotally interconnecting said structure and the beam for swinging the latter; and
- a control pivotally interconnecting said structure and said support for maintaining the latter in a predetermined attitude during swinging of the beam.

2. The invention of claim 1, wherein said boom includes a pair of boom sections and means for swinging one boom section, and equalizing means pivotally interwherein is included a platform pivotally secured to said one boom section, and equalizing means pivotally interconnecting said platform and said support for maintaining said platform level during swinging of said boom sections relative to said support, said equalizing means including a rod pivotally secured to said support in laterally and vertically spaced relationship to said axis of swinging movement of the boom relative to the support.

3. The invention of claim 2, wherein said support is provided with an extension and a finger adjacent to said extension, the outer end of the finger being laterally and vertically spaced from the outer end of the extension, said boom being pivotally mounted to the outer end of the extension, said rod being pivotally mounted to the outer end of the finger.

4. The invention of claim 2 and including a control lever on said platform and control rod of an electrically insulating material coupled with said control lever and shiftably mounted on said one boom section externally of the latter for actuating the means for swinging the one boom section relative to the other boom section.

5. The invention of claim 4, wherein said control rod is releasably secured at the ends thereof to said control lever and said boom section swinging means.

6. In combination:
- a structure;
- an elongated beam pivotally attached to the structure;
- an elongated linkage pivotally attached to the structure, the axes of pivoting of the beam and the linkage to the structure being spaced apart and parallel, the beam and the linkage normally extending upwardly during use thereof and in one direction from the structure;
- a support pivotally attached to both the beam and the linkage, the axes of pivotal connection of the support to the beam and the linkage being parallel, spaced apart a distance substantially equal to the spacing between the axes of pivot of the beam and linkage to the structure, and disposed in a plane parallel to a plane through the axes of pivotal connection of the beam and the linkage to the structure;
- extensible power means pivotally connected with the beam and the structure respectively for swinging and holding the beam to elevate the support relative to the structure;
- a first boom section longer than said beam and pivotally attached to the structure;
- a first equalizing rod longer than said beam and pivotally attached to the support, the axes of pivotal connection of the first boom section and the first equalizing rod to the support being spaced apart and parallel, said first boom section and said first equalizing rod normally extending upwardly during use thereof and in a direction opposite said one direction;
- an assembly pivotally attached to both the first boom section and the first equalizing rod, the axes of pivotal connection of the assembly to the first boom section and the first equalizing rod being parallel, spaced apart a distance substantially equal to the spacing between the axes of pivotal connection of the first boom section and the first equalizing rod to the support, and disposed in a plane parallel to a plane through the axes of pivotal connection of the first boom section and the first equalizing rod to the support;
- a second boom section longer than said first boom section and pivotally attached to said assembly;
- a second equalizing rod longer than said first equalizing rod and pivotally attached to the assembly, the axes of pivotal connection of the second boom section and the second equalizing rod to the assembly being spaced apart and parallel, said second boom section and said second equalizing rod normally extending during use upwardly and substantially in said one direction;
- a coupling pivotally attached to both the second boom section and the second equalizing rod, the axes of pivotal connection of the coupling to the second boom section and the second equalizing rod being parallel, spaced apart a distance substantially equal to the spacing between the axes of pivotal connection of the second boom section and the second equalizing rod to the assembly, and disposed in a plane parallel to a plane through the axes of pivotal connection of the second boom section and the second equalizing rod to the assembly; and
- means providing an operator-carrying platform rigidly secured to said coupling.

7. In combination with a boom having a plate provided with an extension rigid thereto and extending outwardly therefrom, means pivotally connecting the boom with said extension for vertical swinging movement of the boom with respect to the plate, and means pivotally connected with the boom and with said extension adjacent the outer end thereof for swinging the boom, the interconnection of the boom and the extension being spaced from the interconnection of the extension and the boom-swinging means, mechanism for raising and lowering the plate comprising:
- a beam;
- structure supporting the beam for swinging movement about a substantially horizontal axis;
- means mounting said plate on the beam for swinging movement with respect thereto;
- means pivotally interconnecting said structure and the beam for swinging the latter; and
- a control pivotally interconnecting said structure and said plate for maintaining the latter in a predetermined attitude during swinging of the beam.

8. The invention of claim 7, and including an ear rigid to said extension and projecting upwardly therefrom adjacent one longitudinal edge thereof, said beam being pivotally mounted on said ear in outwardly-spaced relationship to said longitudinal edge, said boom being pivotally mounted on said ear for movement about an axis coincident with the axis of swinging movement of the beam relative to said ear.

9. The invention of claim 8, wherein said control is pivotally mounted on said plate in spaced relationship to the connection of said beam and said boom to said ear.

10. In combination with a boom having a support, a pair of boom sections and means for swinging one boom section relative to the other boom section, means pivotally connecting the other boom section with the support for vertical swinging movement with respect thereto, and means pivotally coupled with the support and the other boom section for swinging the latter, mechanism for raising and lowering the support comprising:
- a beam;

structure supporting the beam for swinging movement about a substantially horizontal axis;
means mounting said support on the beam for swinging movement with respect thereto;
means pivotally interconnecting said structure and the beam for swinging the latter;
a control pivotally interconnecting said structure and said support for maintaining the latter in a predetermined attitude during swinging of the beam;
a platform pivotally secured to said one boom section; and
equalizing means pivotally interconnecting said platform with said support for maintaining said platform level during swinging of said boom sections relative to the support, said equalizing means including a rod pivotally secured to said support in laterally and vertically spaced relationship to the axis of swinging movement of the other boom section relative to said support.

11. The invention of claim 10, wherein said support is provided with an extension and a finger adjacent to the extension, the outer end of the finger being laterally and vertically spaced from the outer end of the extension, said other boom section being pivotally mounted on the outer end of the extension, said rod being pivotally mounted on the outer end of the finger.

12. In combination with a boom having a support, means pivotally connecting the boom with the support for vertical swinging movement of the boom with respect to the support, and means pivotally interconnecting the support and the boom for swinging the latter, mechanism for raising and lowering the support comprising:
a beam;
structure supporting the beam for swinging movement about a substantially horizontal axis;
means mounting said support on the beam for swinging movement with respect thereto;
means pivotally interconnecting said structure and the beam for swinging the latter;
a control pivotally interconnecting said structure and said support for maintaining the latter in a predetermined attitude during swinging of the beam;
a platform mounted on the outer end of the boom;
a control lever on the platform; and
a control rod of an electrically insulating material coupled with said control lever and shiftably mounted on said boom externally of the latter for actuating the boom-swinging means in response to the actuation of the control lever.

13. The invention of claim 12, wherein said control rod is releasably coupled at the ends thereof to said control lever and said boom-swinging means.

14. In combination:
a structure;
an elongated beam pivotally attached to the structure;
an elongated linkage pivotally attached to the structure, the axes of pivoting of the beam and the linkage to the structure being spaced apart and parallel, the beam and the linkage normally extending upwardly during use thereof from the structure;
a support pivotally attached to the beam and the linkage adjacent the upper ends thereof, the axes of pivotal connection of the support to the beam and the linkage being parallel, spaced apart a distance substantially equal to the spacing between the axes of pivot of the beam and linkage to the structure, and disposed in a plane parallel to a plane through the axes of pivotal connection of the beam and the linkage to the structure;
first extensible power means pivotally connected with the beam and the structure respectively for swinging holding the beam to elevate the support relative to the structure;
a first boom section pivotally attached to the support for swinging movement about a generally horizontal axis;
a first equalizing rod pivotally attached to the support, the axes of pivotal connection of the first boom section and the first equalizing rod to the support being spaced apart and parallel;
an assembly pivotally attached to both the first boom section and the first equalizing rod, the axes of pivotal connection of the assembly to the first boom section and the first equalizing rod being parallel, spaced apart a distance substantially equal to the spacing between the axes of pivotal connection of the first boom section and the first equalizing rod to the support, and disposed in a plane parallel to a plane through the axes of pivotal connection of the first boom section and the first equalizing rod to the support;
a second boom section pivotally attached to said assembly for swinging movement about a generally horizontal axis;
a second equalizing rod pivotally attached to the assembly, the axes of pivotal connection of the second boom section and the second equalizing rod to the assembly being spaced apart and parallel;
a coupling pivotally attached to both the second boom section and the second equalizing rod, the axes of pivotal connection of the coupling to the second boom section and the second equalizing rod being parallel, spaced apart a distance substantially equal to the spacing between the axes of pivotal connection of the second boom section and the second equalizing rod to the assembly, and disposed in a plane parallel to a plane through the axes of pivotal connection of the second boom section and the second equalizing rod to the assembly;
means providing an operator-carrying platform rigidly secured to said coupling;
second extensible power means for swinging said first boom section relative to said support; and
third extensible power means for swinging said second boom section relative to said first boom section.

References Cited by the Examiner
UNITED STATES PATENTS

| | | | |
|---|---|---|---|
| 3,087,581 | 4/1963 | Pitman | 182—2 |
| 3,108,656 | 10/1963 | Asplundh | 182—2 |
| 3,132,718 | 5/1964 | Pierce | 182—2 X |

HARRISON R. MOSELEY, *Primary Examiner.*

REINALDO P. MACHADO, *Assistant Examiner.*